US012763614B2

(12) United States Patent
Ho et al.

(10) Patent No.: US 12,763,614 B2
(45) Date of Patent: Oct. 13, 2026

(54) WIRELESS CHARGING DEVICE DETECTION WITH PHOTOSENSORS

(71) Applicant: Hewlett-Packard Development Company, L.P., Spring, TX (US)

(72) Inventors: Ken Ho, Taipei City (TW); Chien-Hao Lu, Taipei City (TW); Po Cheng Liao, Taipei City (TW); Chia Ching Lu, Taipei City (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 513 days.

(21) Appl. No.: 18/555,684

(22) PCT Filed: Apr. 19, 2021

(86) PCT No.: PCT/US2021/027965
§ 371 (c)(1),
(2) Date: Oct. 16, 2023

(87) PCT Pub. No.: WO2022/225504
PCT Pub. Date: Oct. 27, 2022

(65) Prior Publication Data
US 2024/0213819 A1 Jun. 27, 2024

(51) Int. Cl.
*H02J 50/90* (2016.01)
*G01J 1/16* (2006.01)
(Continued)

(52) U.S. Cl.
CPC ............ *H02J 50/90* (2016.02); *G01J 1/1626* (2013.01); *H02J 50/10* (2016.02); *H02J 50/80* (2016.02)

(58) Field of Classification Search
CPC .. H02J 50/90; H02J 50/10; H02J 50/80; G01J 1/1626
See application file for complete search history.

(56) References Cited

U.S. PATENT DOCUMENTS 7,772,802 B2 * 8/2010 Manico ................ G06F 1/1632 320/108
2010/0146308 A1 6/2010 Gioscia et al.
2016/0226299 A1 8/2016 Nam et al.

FOREIGN PATENT DOCUMENTS

CN 110932413 A 3/2020
KR 10-2015-0012646 A 2/2015

* cited by examiner

*Primary Examiner* — Carlos Amaya
(74) *Attorney, Agent, or Firm* — Quarles & Brady LLP

(57) ABSTRACT

An example device includes a wireless charging circuit to wirelessly charge a portable electronic device. The device further includes a first photosensor positioned within an effective charging range of the wireless charging circuit, the first photosensor to output a first signal, and a second photosensor positioned outside the effective charging range, the second photosensor to output a second signal. The device further includes a control circuit connected to the wireless charging circuit, the first photosensor, and the second photosensor. The control circuit detects the portable electronic device positioned within the effective charging range of the wireless charging circuit by detecting a difference between the first signal and the second signal. The control circuit turns on the wireless charging circuit in response to detecting the difference. The control circuit turns off the wireless charging circuit in response to detecting that the first signal matches the second signal.

20 Claims, 6 Drawing Sheets

(51) Int. Cl.

| | |
|---|---|
| ***H02J 50/10*** | (2016.01) |
| ***H02J 50/80*** | (2016.01) |

WIRELESS CHARGING DEVICE DETECTION WITH PHOTOSENSORS

BACKGROUND

Wireless charging systems are used to provide power to portable electronic devices without the need of cables, docks, or other physical connectors. Such systems often spend much of the time in standby mode when not charging a device. Often, a test signal or other interrogatory technique is used to detect that a portable electronic device is positioned at a charging location and is ready to be charged.

DETAILED DESCRIPTION

Wireless charging systems and other systems that have standby modes may waste power. For example, a user may use a wireless charging system primarily at night to charge their smartphone. During the day, the wireless charging system may remain plugged in and consume power monitoring for the presence of the smartphone, so that it may respond quickly to begin charging. For example, a wireless charging system may regularly emit a detection/interrogation signal, often from the same coil used for charging, to determine if the smartphone is within charging range, and the generation and emission of such a signal consumes power. As a result, power may be wasted throughout the day or at other times when there is no intention to charge the smartphone.

A low-power presence sensing device is described herein. In various examples, the device detects the presence of a portable electronic device to be charged by a wireless charging circuit, so that the wireless charging circuit may be turned off when not in use to save power.

The device may include two photosensors positioned to sense ambient light until one is occluded by the portable electronic device. A difference in signal of the sensors may be determined to detect the portable electronic device with about 5 lux being a suitable threshold difference.

The device may use less power than active-type systems, such as systems that emit an electromagnetic detection/interrogation signal or other systems that include an integrated light source or other emissive device in addition to sensors that detect reflection or scattering of emitted light or other emitted signal.

Figure 1:
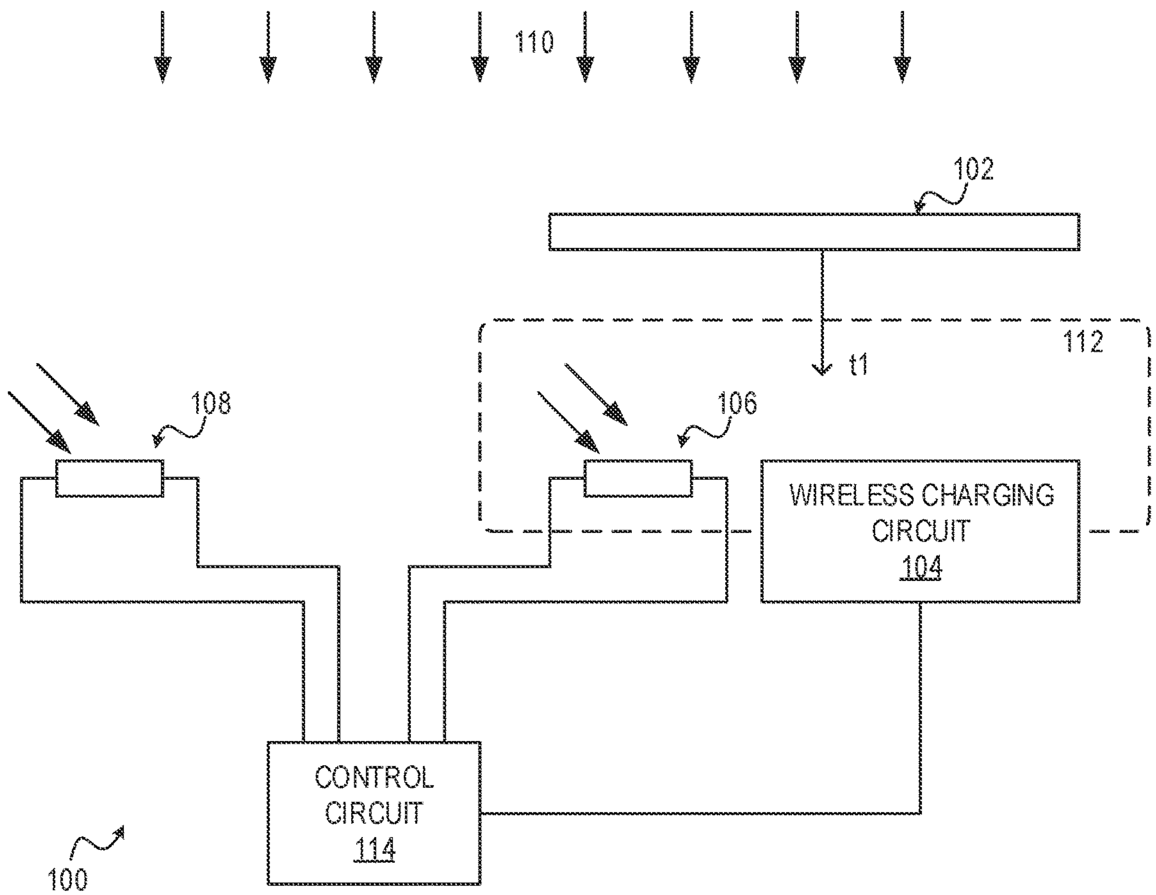
FIG. 1 is a block diagram of an example device with photosensors to detect the presence of a portable electronic device for wireless charging.

FIG. 1 shows an example device 100. The device 100 may be a wireless charging device that is embedded in a housing of a computing device, such as a desktop computer, notebook computer, or all-in-one (AOI) computer, or another type of electronic device such as an imaging device, e.g., a printer, copier, scanner, additive manufacturing machine such as a 3D printer, etc. The device 100 may be used in other applications, such as the dashboard of a car, a table or other piece of furniture, or another structure that includes a location to place a portable electronic device to be charged. The device 100 may be used to charge the battery of a portable electronic device 102, such as a smartphone, tablet computer, smartwatch, or similar battery-powered portable device.

The device 100 includes a wireless charging circuit 104 to wirelessly charge the portable electronic device 102. The wireless charging circuit 104 may be an inductive charging circuit that includes a primary coil that interacts with a secondary coil in the portable electronic device 102. Current provided to the primary coil may electromagnetically induce a current in the secondary coil when the secondary coil is within the effective range of the primary coil, so that a power source that is wire connected to the primary coil may be used to power a device and/or charge a battery that is wire connected to the secondary coil.

The device 100 further includes photosensors 106, 108 positioned to be sensitive to ambient light 110 around the device 100, so as to detect the presence of the portable electronic device 102. Sensed light may be visible, infrared, near-infrared, or a combination of such. An example of a suitable photosensor is a photoresistor or other device capable of sensing light or other electromagnetic radiation. Further, the device 100 may omit an active illumination source that in reflective- or backscattering-type systems may be used to illuminate a target object, so that a photosensor may detect a reflection that indicates the presence of the target object. Rather, the device 100 detects the presence of a portable electronic device 102 based on its occlusion of ambient light. The omission of such a light source may reduce power consumption of the device 100 as compared to reflective- or backscattering-type systems.

A first photosensor or device-detecting photosensor 106 is positioned within an effective charging range 112 of the wireless charging circuit 104. The first photosensor 106 may thus be occluded from ambient light 110 by the housing of the portable electronic device 102 during charging. The first photosensor 106 outputs a first signal, such as a voltage, representative of an intensity of ambient light 110 incident on the first photosensor 106.

A second photosensor or ambient-light photosensor 108 is positioned outside the effective charging range 112 of the wireless charging circuit 104 and at a position that is not occluded from ambient light 110 by the housing of the portable electronic device 102 during charging. The second photosensor 108 outputs a second signal, such as a voltage, representative of an intensity of ambient light 110 incident on the second photosensor 108.

The effective charging range 112 may be considered to be a volume around the wireless charging circuit 104 in which the portable electronic device 102 may be situated and receive electromagnetically inductive charging from the wireless charging circuit 104. When the portable electronic device 102 is positioned inside the effective charging range

112, it receives power from the wireless charging circuit 104. If positioned outside the effective charging range 112, the portable electronic device 102 does not receive power or receives a negligible amount of power from the wireless charging circuit 104. The effective charging range 112 may depend on the specific implementation of the wireless charging circuit 104. While some electromagnetic induction is expected even at large distances from a primary coil, the effective charging range 112 may be relatively small due to expected performance characteristics and time constraints when charging a device.

The device 100 further includes a control circuit 114. The photosensors 106, 108 and wireless charging circuit 104 are connected to a control circuit 114. The control circuit 114 controls the wireless charging circuit 104 to turn off when the portable electronic device 102 is absent from the effective charging range 112. The control circuit 114 further controls the wireless charging circuit 104 to turn on when the portable electronic device 102 is determined to be present in the effective charging range 112. The control circuit 114 may assume the portable electronic device 102 is absent unless detected. The control circuit 114 may be considered a presence detection circuit.

Figure 2:
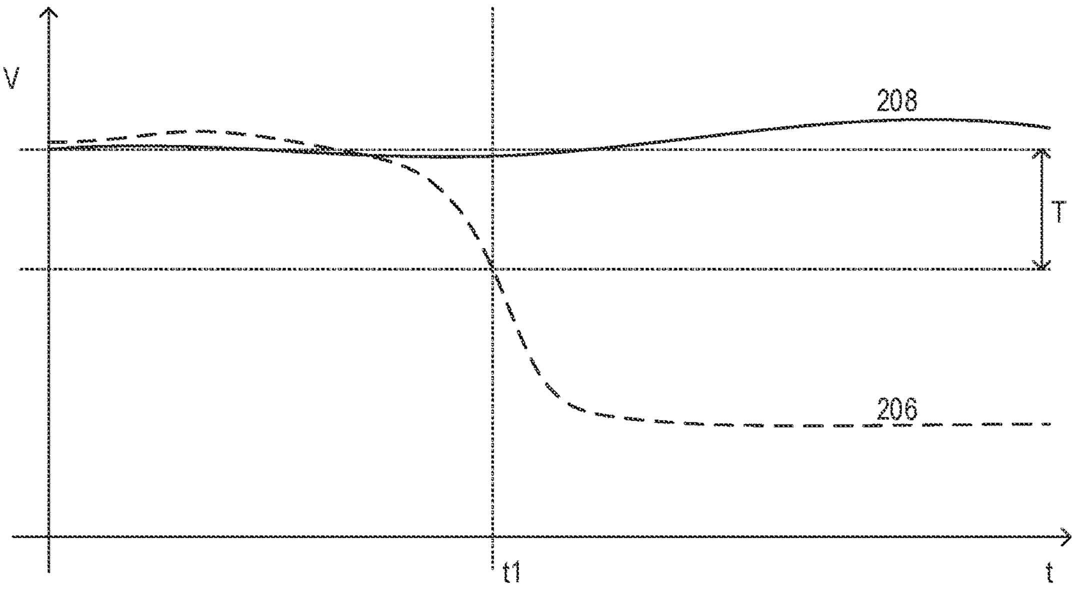
FIG. 2 is an example signal diagram of a threshold difference in ambient light signals to detect the presence of a portable electronic device for wireless charging.

FIG. 2 shows an example signal diagram of a threshold difference in ambient light signals to detect the presence of a portable electronic device for wireless charging. With reference to the components of FIG. 1, the control circuit 114 receives signals 206, 208 from the photosensors 106, 108, respectively, and uses the signals 206, 208 to determine whether the portable electronic device 102 is positioned within the effective charging range 112 of the wireless charging circuit 104.

The control circuit 114 detects a difference between a first signal 206 outputted by the first photosensor 106 that is positioned inside the effective charging range 112 and a second signal 208 outputted by the second photosensor 108 that is outside the effective charging range 112. The control circuit 114 determines whether the difference is indicative of the presence of the portable electronic device 102 in the effective charging range 112 and, if so, turns on the wireless charging circuit 104 in response. Conversely, the control circuit 114 turns off the wireless charging circuit 104 in response to detecting that the first signal 206 matches the second signal 208. In other words, the ambient-light photosensor 108 provides a reference for evaluation of the device-detecting photosensor 106 to detect the portable electronic device 102.

The control circuit 114 may detect a difference between the signals 206, 208 by using a threshold difference. That is, if the difference between the signals 206, 208 exceeds a threshold amount T, then the difference is detected. Otherwise, the signals 206, 208 are considered to match. An example threshold difference is a threshold intensity of between about 3 to about 8 lux, such as about 5 lux, where lux is illuminance or luminous flux per unit area. The threshold difference may be configurable and/or may be calibrated to a specific value depending on ambient lighting conditions. Voltage or other directly measurable quantity may stand for intensity, luminance, or other measure of light. For example, the control circuit 114 may operate on voltage values representative of luminance and the threshold difference may be a difference in voltages.

The control circuit 114 may include a comparator to determine the difference in the signals 206, 208. The comparator may output a control signal that turns the wireless charging circuit 104 on or off based on the difference respectively exceeding or matching a threshold difference.

With reference to the example shown in FIGS. 1 and 2, portable electronic device 102 is shown as being moved into effective charging range 112 of the wireless charging circuit 104. At a time t1, the difference between signals 206, 208 exceeds the threshold difference T and the wireless charging circuit 104 is turned on. The difference between signals 206, 208 may continue to grow, as depicted, as the portable electronic device 102 comes to its rest position.

The control circuit 114 determines the presence/absence of the portable electronic device 102, and this determination may be in addition to detection functionality implemented by the wireless charging circuit 104. Detection using the control circuit 114 may turn on the wireless charging circuit 104, which may then follow its own protocol to detect the portable electronic device 102 to determine whether the portable electronic device 102 is compatible, to determine whether charging is possible and/or necessary, and to activate the primary coil accordingly. The control circuit 114 can thus reduce or eliminate power consumption by the wireless charging circuit 104 that might otherwise result from a detection process used by the wireless charging circuit 104 to detect the portable electronic device 102. For example, in a standby mode, the wireless charging circuit 104 may regularly output a test signal and look for change of capacitance in its coil to detect the portable electronic device 102 and this may consume power (e.g., standby power). The control circuit 114 and photosensors 106, 108 may prevent activation of the detection process of the wireless charging circuit 104 until a likely detection of the portable electronic device 102, so as to save power.

The terminology turning on/off is used in this example to mean that detection process implemented by the wireless charging circuit 104 is turned on/off or activated/deactivated, so as to reduce or eliminate the power consumed by the detection process. In various examples, turning off the wireless charging circuit 104 may include cutting off all power to the wireless charging circuit 104. In various examples, turning off the wireless charging circuit 104 prevents the wireless charging circuit 104 from entering its standby mode and instead shuts off the standby mode or turns off all power to the wireless charging circuit 104.

The control circuit 114 may include discrete logic components, such as a comparator. The control circuit 114 may include a processor, such as an embedded controller (EC), a microcontroller, a microprocessor, a field-programmable gate array (FPGA), an application-specific integrated circuit (ASIC), or a similar device capable of executing instructions. The control circuit 114 may include a non-transitory machine-readable medium, which may include an electronic, magnetic, optical, or other physical storage device that encodes instructions that implement the signal capture, comparison, and on/off control functionality discussed herein. The machine-readable medium may include, for example, random-access memory (RAM), read-only memory (ROM), electrically-erasable programmable read-only memory (EEPROM), or flash memory that cooperates with the processor to store and execute instructions.

The instructions may be directly executed, such as a binary file, and/or may include interpretable code, bytecode, source code, or similar instructions that may undergo additional processing to be executed. All of such examples may be considered processor-executable instructions.

The photosensors 106, 108 may be calibrated against a known reference, such as the absence or near absence of ambient light. For example, the control circuit 114 may detect that both photosensors 106, 108 output signals indicating low levels for a duration of time, and may thus determine that ambient light is low or absent. The control circuit 114 may then calibrate the photosensors 106, 108 to darkness by storing the signal values and using same as a reference of 0 lux (or some other darkness reference value) for future measurements. In other examples, the photosensors 106, 108 may be calibrated to darkness with manual intervention, such by a user or manufacturer covering the photosensors 106, 108 with an object to create darkness and triggering the control circuit 114 to record calibration values.

Figure 3:
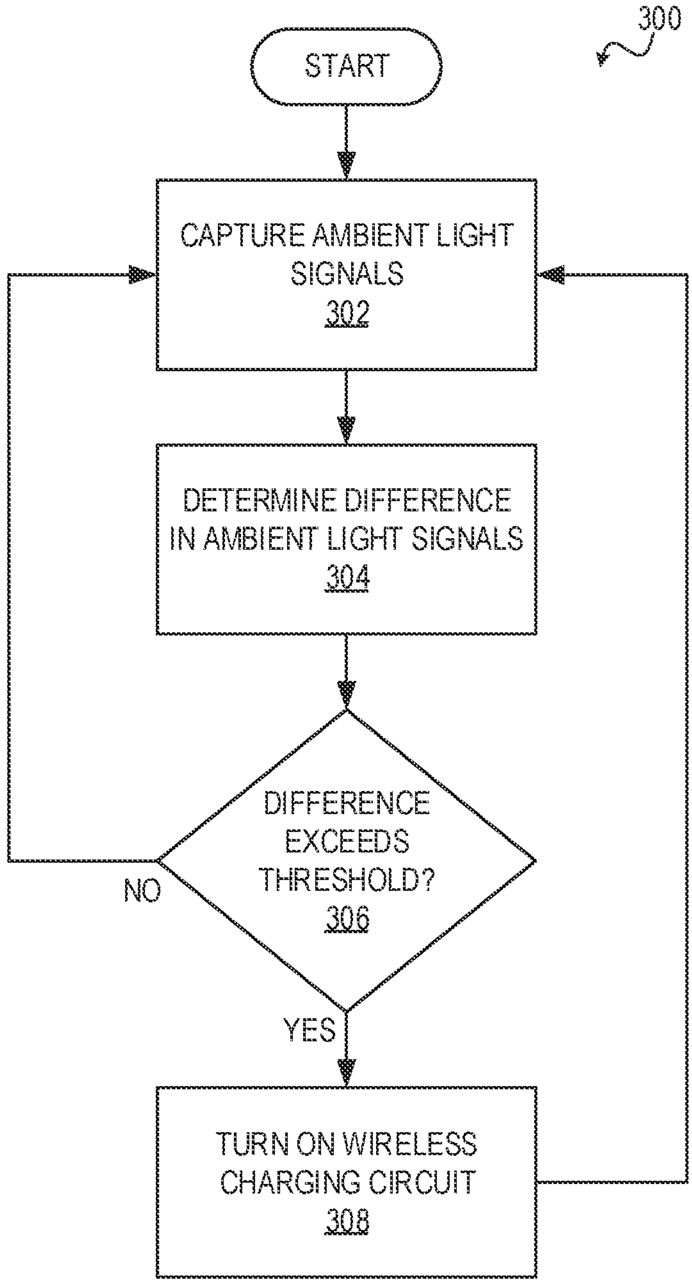
FIG. 3 is a flowchart of an example method of detecting a portable electronic device based on a difference in sensed ambient light.

FIG. 3 shows an example method 300 of detecting a portable electronic device based on a difference in sensed ambient light, as sensed by two photosensors, for example. The method 300 may be implemented by a control circuit, as discussed elsewhere herein.

At block 302, ambient light signals are captured from photosensors positioned to sense ambient light incident at a wireless charging circuit. The photosensors are separated by a distance sufficient for a photosensor to be occluded from ambient light by a portable electronic device, while at the same time another photosensor is not occluded. The photosensor that is to be occluded may be positioned inside the effective range of the wireless charging circuit, while the other photosensor that is to provide the reference ambient light level for sake of comparison may be positioned outside the effective range of the wireless charging circuit.

At block 304, a difference between the ambient light signals is determined to determine whether or not a portable electronic device or like-sized object has been placed within the effective range of the wireless charging circuit and thus blocks the device-detecting photosensor but does not block ambient light from reaching the photosensor outside the effective range.

At block 306, the difference in ambient light is compared to a threshold difference, which may be voltage difference that represents about between 3 to 8 lux, such as about 5 lux. If the threshold difference is exceeded, then the device-detecting photosensor is determined to be sufficiently occluded to determine that a portable electronic device or other object has likely been placed in the charging position of the wireless charging circuit. If the threshold difference is not exceeded, that is, if the signals match sufficiently, then the method 300 repeats without turning on the wireless charging circuit.

At block 308, in response to determining the difference in signals represents a detection, the wireless charging circuit is turned on. The wireless charging circuit may then perform its own detection/interrogation of the object detected within its effective range to determine whether the object is a compatible portable electronic device in need of charging.

The method 300 may be repeated continually to turn on the wireless charging circuit when an object that is potentially a portable electronic device is detected. The method 300 may further turn off the wireless charging circuit when no such object is detected or when a previously detected object is removed.

The method 300 may be performed regularly or periodically, for example, according to a photosensor sampling rate that is selected to reduce power consumption and provide a desired responsiveness for detection of the portable electronic device. Example sample rates include one sample per second, one sample per ten seconds, and one sample per minute.

Figure 4:
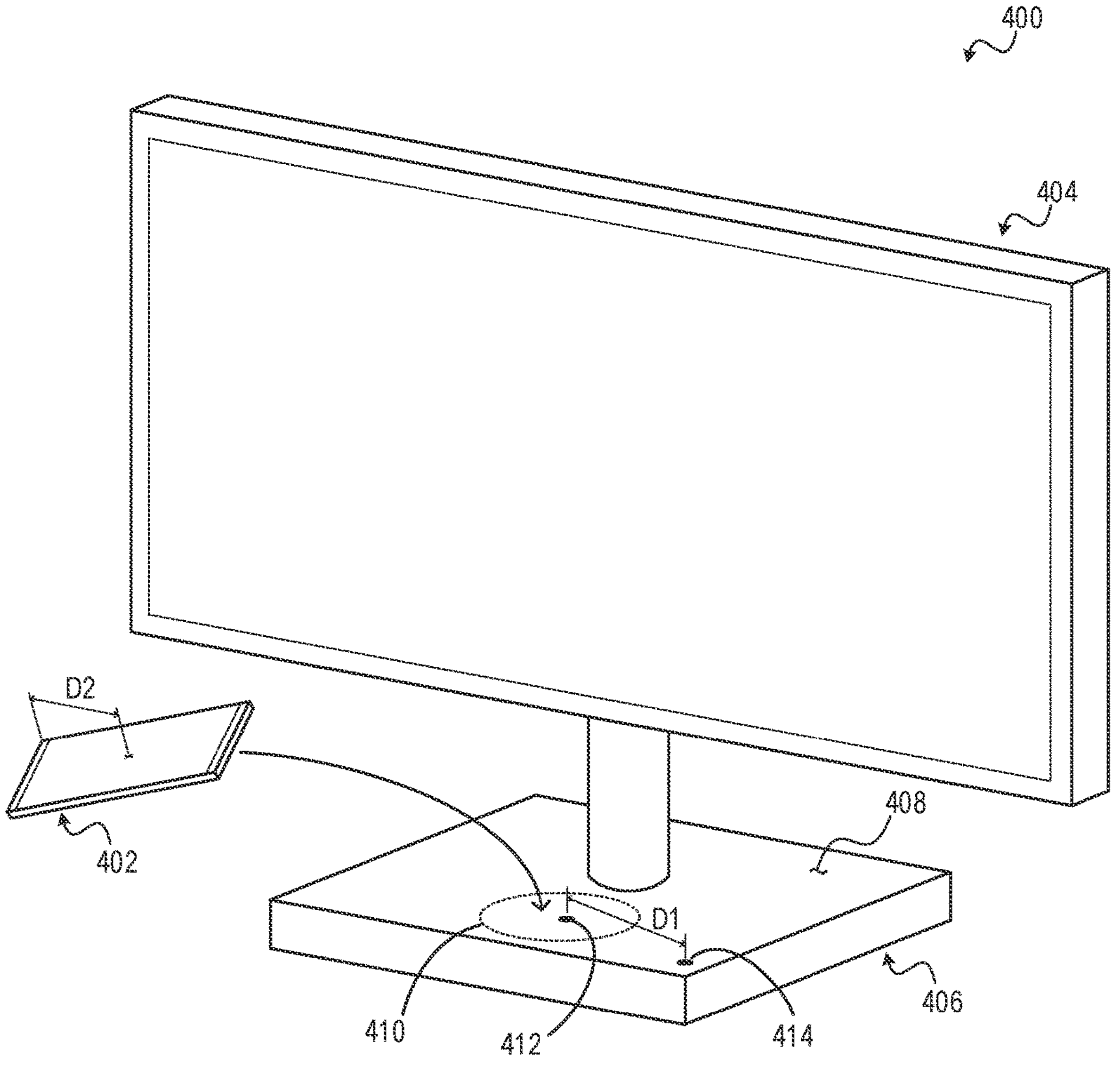
FIG. 4 is a perspective view of an example computing device that includes a wireless charging circuit and ambient light sensing photosensors to detect the presence of a portable electronic device for wireless charging.

FIG. 4 shows an example computing device 400 capable of wirelessly charging a portable electronic device 402 based on detection of the device 402 by ambient light sensing photosensors.

The computing device 400 includes a display 404 and a main housing 406 that contain a processor, memory, and other integrated circuitry to operate the computing device 400. The computing device 400 may further include peripheral devices, such as a keyboard and mouse (not shown).

The housing 406 includes a surface 408, which may be a horizontal surface or other surface capable of supporting the portable electronic device 402.

The computing device 400 includes a wireless charging circuit that has an effective charging range 410 at the surface 408 of the housing 406. In various examples, the wireless charging circuit is positioned below the surface 408 and inside the housing 406 with a primary coil that is positioned inside the housing 406 close to the surface 408 to provide inductive charging through the surface 408. The region of the housing 406 in the effective charging range 410 may be made of material conducive to inductive charging.

The computing device 400 further includes photosensors 412, 414 positioned to sense ambient light incident at the surface 408 of the housing 406. A device-detecting photosensor 412 is positioned inside the effective charging range 410 of the wireless charging circuit. An ambient-reference photosensor 414 is positioned outside the effective charging range 410.

The photosensors 412, 414 may be separated by a distance D1 that is greater than half of a largest dimension D2 of the expected portable electronic device 402, so that the portable electronic device cannot be physically positioned to block ambient light from shining on both photosensors 412, 414 at the same time. The largest dimension of a rectangular portable electronic device 402 may be its largest diagonal dimension. In various examples, the distance D1 separating the photosensors 412, 414 is greater than between about 10 cm to about 20 cm, such as about 15 cm.

The photosensors 412, 414 may be positioned so as to be fully exposed to ambient light or to be shaded from ambient light (e.g., by the display 404, other components of the computing device 400, and/or the user) to approximately the same degree during normal use.

The computing device 400 further includes a presence detection circuit to capture ambient light-level signals from photosensors 412, 414 to determine whether the difference in signal levels indicates that an object is present effective charging range 410.

Figure 5:
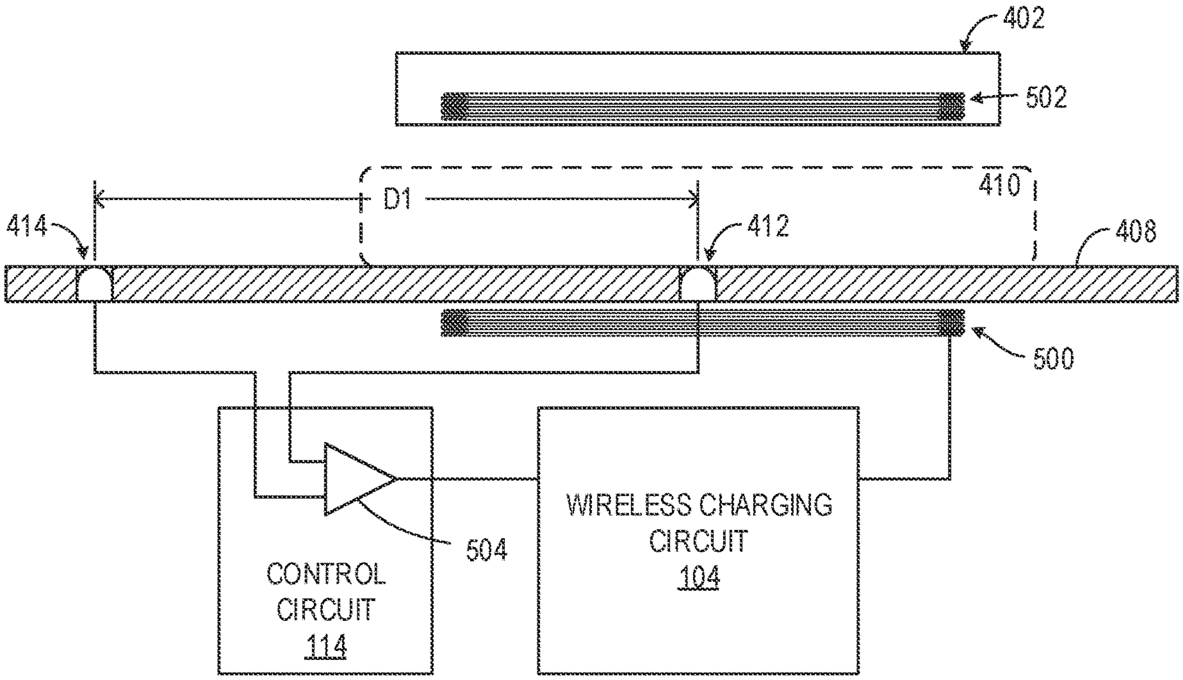
FIG. 5 is a schematic side-view of the example computing device of FIG. 4.

FIG. 5 shows a schematic cross-sectional view of a portion of the main housing 406 of the computing device 400. The photosensors 412, 414 may be positioned at openings in the surface 412 of the housing. The device-detecting photosensor 412 may be positioned at the center of a primary coil 500 of the wireless charging circuit 104. The primary coil 500 may induce a current in a secondary coil 502 of the portable electronic device 402, when the portable electronic device 402 is located within the effective charging range 410. Also, shown is the ambient-reference photosensor 414 positioned outside the effective charging range 410, and a control circuit 114 that includes a comparator 504 that determines whether light intensity signals of the photosensors 412, 414 match or whether the light intensity signal of the device-detecting photosensor 412 signifies a reduction in ambient light, as compared to the ambient reference, sufficient to indicate the presence of the portable electronic device 402 in the effective charging range 410 of the wireless charging circuit 104.

Figure 6:
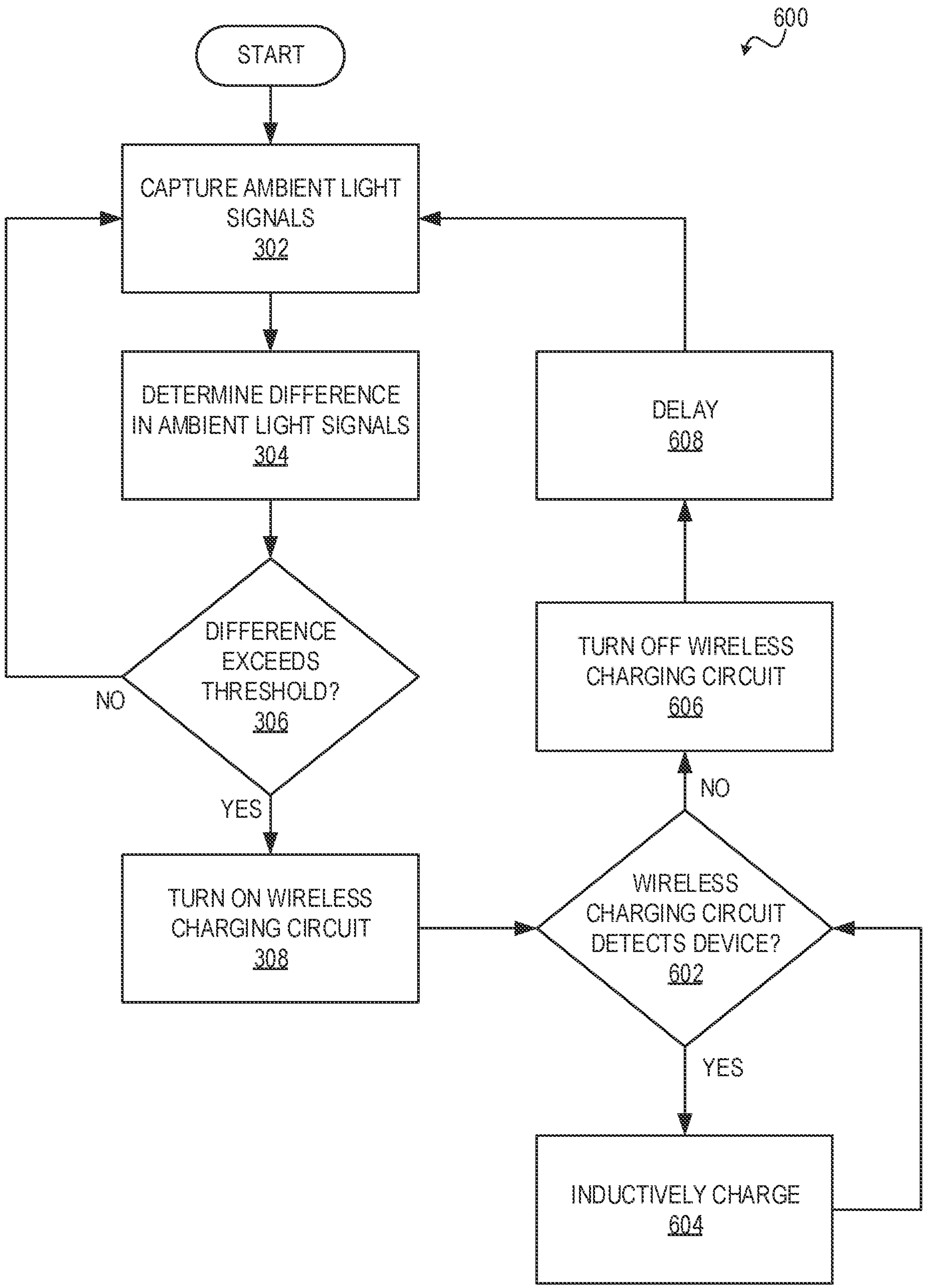
FIG. 6 is a flowchart of an example method of detecting a portable electronic device based on a difference in sensed ambient light and consequent operations of a wireless charging circuit.

FIG. 6 shows an example method 600 of detecting a portable electronic device based on a difference in sensed ambient light, as sensed by two photosensors, for example, and subsequent operations performed by a wireless charging circuit. The method 600 may be implemented by a control circuit, as discussed elsewhere herein.

At blocks 302-308, ambient light signals are captured from the photosensors to determine whether a difference in light levels at different locations, including within the effective range of the wireless charging circuit, is significant enough to determine that an object is present in the effective range of the wireless charging circuit. If an object is detected, then the wireless charging circuit is turned on. The above description for blocks 302-308 may be referenced for details not repeated here.

Once the wireless charging circuit is turned on, it begins its own operational protocol, which may include detecting the presence of a suitable device to charge by, for example, outputting an electromagnetic test signal and monitoring for an electromagnetic response from the device to be charged. The wireless charging circuit may initially enter a standby mode to carry out the detection operation.

At block 602, if the object detected by the ambient light signals is determined by the wireless charging circuit to be a compatible device in need of charging, then the wireless charging circuit inductively charges the device, at block 604. The wireless charging circuit may continue to monitor for the continued presence of the device via block 602.

If, at block 602, a compatible device is not detected by the wireless charging circuit after initial object detection by the ambient light signals, or if a device being charged is removed from the effective range of the wireless charging circuit, then the wireless charging circuit is turned off, at block 606. Note that normally the wireless charging circuit would enter its standby mode to again attempt to detect a suitable device in need of charging. However, in the examples provided in this disclosure, the wireless charging circuit is turned off to save power that would be otherwise consumed by the standby mode.

At block 608, a delay may be provided after the wireless charging circuit is turned off and before consideration of the ambient light signals is resumed, so as to prevent undue cycling of the wireless charging circuit on and off due to spurious changes in ambient light.

As can be seen from FIG. 6, blocks 302-306 provide low-power ambient light-based detection of an object that may be a portable electronic device that is to be charged. Block 602 confirms or negates the initial determination, at the cost of a short duration of increased power usage. Further, block 606 overrides the normal standby behavior of the wireless charging circuit, so as to return to the low-power ambient light-based detection protocol when possible. Hence, blocks 302-306 and 606 represent a low-power detection protocol that brackets the normal but relatively high-power detection protocol that is normally used by the wireless charging circuit. The low-power ambient light-based detection protocol is suitable to be operated continually, while the higher-power detection by the wireless charging circuit may be activated as needed and deactivated when not needed, so as to save power. Moreover, the low-power ambient light-based detection protocol need not be as accurate as the detection protocol of the wireless charging circuit, as the latter confirms the former before charging is allowed to commence. The low-power ambient light-based detection protocol may be viewed as an opportunistic methodology that saves power when possible.

The method 600 may be performed regularly or periodically, for example, according to a photosensor sampling rate that is selected to reduce power consumption and provide a desired responsiveness for detection of the portable electronic device. Example sample rates include one sample per second, one sample per ten seconds, and one sample per minute.

Figure 7:
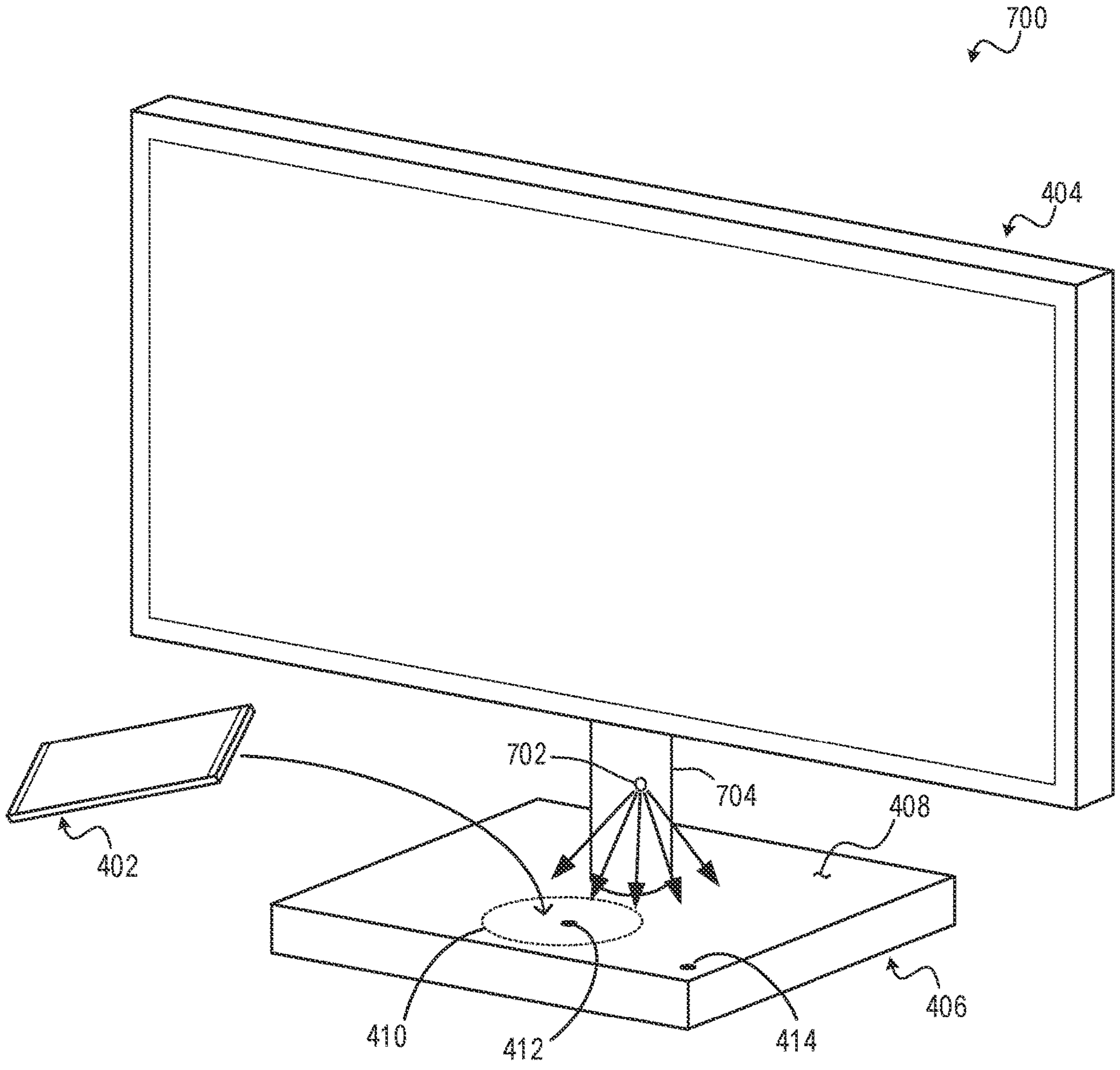
FIG. 7 is a perspective view of an example computing device that includes a wireless charging circuit and ambient light sensing photosensors with an attached ambient light source.

FIG. 7 shows an example device 700 that includes a light a source to provide ambient light. The device 400 of FIG. 4 may be referenced for detail not repeated here.

As some environments may have low or unpredictable ambient light levels, the device 700 may include a light source 702 that may be provided to a housing or other structure 704 above the photosensors 412, 414. The light source 702 may be aimed towards the photosensors 412, 414 so as to cast light onto the photosensors 412, 414. A difference in light level detected by the photosensors 412, 414 may thus detect an object, as discussed elsewhere herein. The light source 702 may be considered an ambient light source or pseudo-ambient light source rather than an active light source, as the light source 702 is not connected to the circuit that operates the photosensors 412, 414 and is not used for reflective or backscattering detection.

A wireless charging circuit may consume about 200 mW AC (or 150 mW DC) in standby mode and this may be a waste of power and may violate modern low-energy standards or make such standards difficult to meet. Various examples described herein are expected to consume around 15 mW, which is an order of magnitude lower than the standby mode of such a wireless charging circuit. The standby mode may still be used once an object that is presumed to be a device to be charged is detected, so as to confirm the presence of a compatible device and determine the degree of a charging needed.

The examples described herein may be tuned with an aggressive sensitivity, so as to turn on the wireless charging circuit even when the likelihood of a true detection is low. The wireless charging circuit itself may then verify the detection and proceed to charge the detected device or may nullify the detection. The incremental increase in total power consumption resulting from false positives may be tolerable in many implementations, particularly when the tradeoff is a greater overall power savings. Finally, an active illumination source that is often used in reflective- or backscattering-type detectors is omitted, which further saves power and simplifies implementation.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A device comprising:

a wireless charging circuit to wirelessly charge a portable electronic device;

a first photosensor positioned within an effective charging range of the wireless charging circuit, the first photosensor to output a first signal;

a second photosensor positioned outside the effective charging range of the wireless charging circuit, the second photosensor to output a second signal; and a control circuit connected to the wireless charging circuit, the first photosensor, and the second photosensor;

the control circuit to detect the portable electronic device as positioned within the effective charging range of the wireless charging circuit by detecting a difference between the first signal and the second signal;

the control circuit to turn on the wireless charging circuit in response to detecting the difference; and the control circuit to turn off the wireless charging circuit in response to detecting that the first signal matches the second signal.

2. The device of claim 1, wherein the control circuit is to detect the portable electronic device as positioned within the effective charging range of the wireless charging circuit when the first signal indicates a light intensity that is lower than a light intensity indicated by the second signal by at least about 5 lux.

3. The device of claim 1, wherein:

the first photosensor is positioned to be occluded from ambient light by a housing of the portable electronic device; and wherein the second photosensor is positioned to not be occluded from ambient light by the housing of the portable electronic device.

4. The device of claim 1, wherein the control circuit includes a comparator to determine the difference between the first signal and the second signal.

5. The device of claim 1, wherein the first and second photosensors comprise photoresistors.

6. A device comprising:

a wireless charging circuit to wirelessly charge a portable electronic device; and a presence detection circuit connected to the wireless charging circuit, the presence detection circuit comprising:

a device-detecting photosensor positioned to sense ambient light and to be occluded by the portable electronic device when the portable electronic device is positioned at the wireless charging circuit;

an ambient-light photosensor positioned to sense ambient light and to not be occluded by the portable electronic device when the portable electronic device is positioned at the wireless charging circuit; and a comparator to determine a difference in light intensity sensed by the device-detecting photosensor and the ambient-light photosensor, the comparator to output a signal that turns on the wireless charging circuit when the difference in light intensity exceeds a threshold difference.

7. The device of claim 6, wherein the comparator is further to output a signal that turns off the wireless charging circuit when the difference in light intensity does not exceed the threshold difference.

8. The device of claim 6, wherein the threshold difference is about 5 lux.

9. The device of claim 6, wherein the presence detection circuit does not include an illumination source.

10. The device of claim 6, wherein the presence detection circuit does not switch the wireless charging circuit into a standby mode.

11. A computing device comprising:

a housing including a surface;

a wireless charging circuit positioned within an effective range of the surface of the housing;

photosensors positioned to sense ambient light incident at the surface of the housing, wherein the photosensors are separated by a distance; and a circuit connected to the photosensors, the circuit to detect a portable electronic device placed on the surface by determining a difference in signals outputted by the photosensors and, in response to determining the difference in the signals outputted by the photosensors, the circuit to turn on the wireless charging circuit to charge the portable electronic device.

12. The computing device of claim 11, wherein, in response to not determining the difference in the signals outputted by the photosensors, the circuit is to turn off the wireless charging circuit.

13. The computing device of claim 11, wherein the distance separating the photosensors is greater than half of a largest dimension of the portable electronic device.

14. The computing device of claim 11, wherein the distance separating the photosensors is greater than about 15 cm.

15. The computing device of claim 11, wherein the difference is a difference in voltage representative of a difference in ambient light intensity of at least about 5 lux.

16. The device of claim 1, wherein the device does not include an illumination source to detect the portable electronic device.

17. The computing device of claim 11, wherein the computing device does not include an illumination source to detect the portable electronic device.

18. The computing device of claim 11, wherein the circuit includes a comparator to determine the difference in the signals outputted by the photosensors.

19. The device of claim 1, wherein the first photosensor and the second photosensor are separated by a distance greater than about 15 cm.

20. The device of claim 6, wherein the device-detecting photosensor and the ambient-light photosensor are separated by a distance greater than about 15 cm.

* * * * *